US012528025B1

(12) United States Patent
Spinosa et al.

(10) Patent No.: US 12,528,025 B1
(45) Date of Patent: Jan. 20, 2026

(54) POWERED MAGNETIC BLOCKS

(71) Applicant: Magnet Brothers Inc., Naples, FL (US)

(72) Inventors: Daniel Spinosa, Dripping Springs, TX (US); Michael Spinosa, Naples, FL (US)

(73) Assignee: Magnet Brothers Inc., Naples, FL (US)

( * ) Notice: Subject to any disclaimer, the term of this patent is extended or adjusted under 35 U.S.C. 154(b) by 10 days.

(21) Appl. No.: 18/651,046

(22) Filed: Apr. 30, 2024

(51) Int. Cl.
*A63H 33/04* (2006.01)
*A63H 33/26* (2006.01)
*F21V 33/00* (2006.01)

(52) U.S. Cl.
CPC ............ *A63H 33/04* (2013.01); *A63H 33/26* (2013.01); *F21V 33/008* (2013.01); *A63H 2200/00* (2013.01)

(58) Field of Classification Search
None
See application file for complete search history.

(56) References Cited

U.S. PATENT DOCUMENTS 2,448,832 A * 9/1948 Ross .................. H01R 13/7036 200/51.09
2,872,754 A 2/1959 Luther
3,237,341 A * 3/1966 Janning ..................... F21S 9/02 273/238
3,696,548 A * 10/1972 Teller ................... A63H 33/042 446/91
4,132,031 A * 1/1979 Psyras .................... A63H 33/26 446/47
4,883,440 A * 11/1989 Bolli .................... A63H 33/042 446/128

(Continued)

*Primary Examiner* — Eugene L Kim
*Assistant Examiner* — Alyssa M Hylinski
(74) *Attorney, Agent, or Firm* — Baker Botts L.L.P.

(57) ABSTRACT

Blocks or tiles can be magnetically connected in arbitrary arrangements or structures. Each block or tile comprises electric power conducting elements that enable conducting power within and between adjacent blocks or tiles when terminals of the blocks or tiles are brought into contact and held via magnetic attractive forces. In one embodiment, a set comprises two or more blocks, each particular block of the plurality of blocks comprising a top cover; a bottom cover affixed to the top cover, the bottom cover comprising three or more edges; one or more magnets mounted respectively near each of the three or more edges: a first edge among the three or more edges comprising a first electrical terminal, a second electrical terminal, and a third electrical terminal; a second edge among the three or more edges comprising a fourth electrical terminal, a fifth electrical terminal, and a sixth electrical terminal; in the bottom cover, at least one conductor that is conductively coupled between the second electrical terminal, the third electrical terminal, the fifth electrical terminal, and the sixth electrical terminal; in the bottom cover, a functional component that is conductively coupled to the at least one conductor and to one or more of the first electrical terminal and the fourth electrical terminal, wherein the functional component comprises one or more electrical or electronic components.

27 Claims, 7 Drawing Sheets

(56) References Cited

U.S. PATENT DOCUMENTS

| | | | | |
|---|---|---|---|---|
| 5,018,980 | A * | 5/1991 | Robb | H01R 35/04 313/3 |
| 5,445,552 | A * | 8/1995 | Hine | A63H 33/042 446/485 |
| 5,902,166 | A * | 5/1999 | Robb | B60Q 1/34 446/485 |
| 6,364,509 | B1 * | 4/2002 | Johnson, III | A63H 17/32 446/175 |
| 7,080,927 | B2 * | 7/2006 | Feuerborn | F21S 2/005 362/249.14 |
| 7,846,002 | B1 * | 12/2010 | Mikesell | A63H 33/042 446/92 |
| 8,371,894 | B1 * | 2/2013 | Rosen | A63H 33/108 446/485 |
| 8,864,546 | B1 * | 10/2014 | Capriola | A63H 33/042 446/124 |
| 8,873,239 | B2 * | 10/2014 | McRae | H02J 50/10 361/728 |
| 9,314,707 | B2 | 4/2016 | Ornstein et al. | |
| 9,636,600 | B2 | 5/2017 | Rudisill et al. | |
| 9,755,357 | B1 * | 9/2017 | Kim | A63H 33/042 |
| 10,047,940 | B2 * | 8/2018 | Grunzweig | F21S 2/00 |
| 10,258,896 | B2 | 4/2019 | Ornstein et al. | |
| 10,531,542 | B2 * | 1/2020 | Rodinger | H05B 47/199 |
| 10,711,467 | B1 | 7/2020 | Britton et al. | |
| 10,857,475 | B2 | 12/2020 | Moskowitz | |
| 2007/0184722 | A1 * | 8/2007 | Doherty | A63H 33/042 439/638 |
| 2009/0047863 | A1 * | 2/2009 | Capriola | A63H 33/042 446/91 |
| 2009/0264043 | A1 * | 10/2009 | Wittenberg | A63H 3/28 446/297 |
| 2011/0317391 | A1 * | 12/2011 | Peng | A63H 33/042 361/809 |
| 2012/0244969 | A1 * | 9/2012 | Binder | A63B 43/004 473/570 |
| 2013/0183882 | A1 * | 7/2013 | Oschuetz | A63H 33/042 446/90 |
| 2014/0349544 | A1 * | 11/2014 | Chien | A63H 33/042 446/91 |
| 2014/0378023 | A1 * | 12/2014 | Muthyala | G06T 19/00 446/91 |
| 2015/0231521 | A1 | 8/2015 | Peterson | |
| 2016/0325200 | A1 * | 11/2016 | Lu | A63H 33/042 |
| 2017/0023219 | A1 * | 1/2017 | Grunzweig | F21V 23/002 |
| 2018/0056206 | A1 | 3/2018 | Micko et al. | |
| 2019/0054388 | A1 * | 2/2019 | Cranias | A63H 33/26 |
| 2019/0190196 | A1 * | 6/2019 | Bdeir | H01R 12/718 |
| 2019/0232184 | A1 * | 8/2019 | Agudelo | G09B 1/30 |
| 2020/0246715 | A1 | 8/2020 | Bensussan et al. | |
| 2021/0121791 | A1 | 4/2021 | Ornstein et al. | |
| 2021/0213369 | A1 * | 7/2021 | Yamaai | A63H 29/22 |

* cited by examiner

POWERED MAGNETIC BLOCKS

COPYRIGHT NOTICE

A portion of this patent document's disclosure contains material subject to copyright protection. The copyright owner has no objection to the facsimile reproduction by anyone of the patent document or the patent disclosure, as it appears in the Patent and Trademark Office patent file or records, but otherwise reserves all copyright or rights. © 2024 Magnet Brothers Inc.

TECHNICAL FIELD

One technical field of the present disclosure is modular blocks for building or constructing structures. Another technical field is low-voltage power distribution in modular blocks. Yet another technical field is kits and sets of electric or electronic components, including educational kits, science fair kits, and sets for play.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Constructing structures with modular blocks is an educational and enjoyable activity for persons of many ages. Building blocks, magnetic building tiles, and construction sets with logs, girders, panels, or other articles are commercially available. Some are arranged as toys, and others as educational kits, science fair kits, or other sets. These articles suffer from the disadvantage that constructing a structure requires sufficient ambient room or exterior lighting for a sighted person to see the blocks or other components while using them or building a structure. Furthermore, the educational value and play value of certain toy construction articles can be limited when each block or other component has a single color and limited functionality.

Based on the foregoing, the referenced technical fields have developed an acute need for building blocks, tiles, or other articles with more interesting features.

SUMMARY

The appended claims may serve as a summary of the invention.

BRIEF DESCRIPTION OF THE DRAWINGS

Example embodiments are illustrated in the views of the following drawing figures, in which like reference numerals indicate like parts.

DETAILED DESCRIPTION

Figure 1:
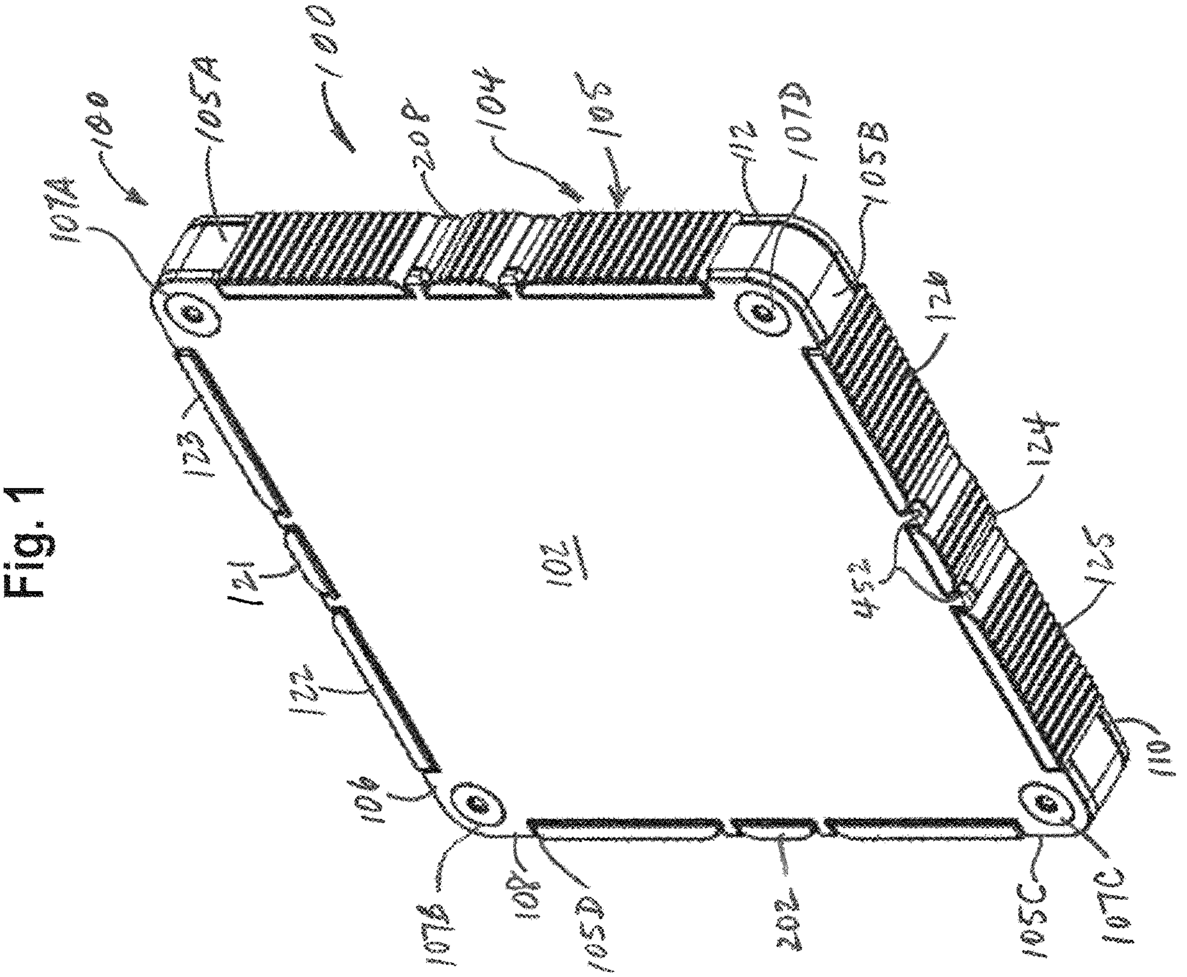
FIG. 1 is a perspective view of a powered magnetic block of one embodiment.

The following description sets forth numerous specific details to provide a thorough understanding of the present invention. However, it will be apparent that the present invention may be practiced without these specific details. In other instances, well-known structures and devices are shown in block diagram form to avoid unnecessarily obscuring the present invention.

This disclosure may describe one or more different inventions, with alternative embodiments to illustrate examples. Other embodiments may be utilized, and structural, logical, software, electrical, and other changes may be made without departing from the scope of the claimed inventions. Various modifications and alterations are possible and expected. Some features of one or more of the inventions may be described with reference to one or more embodiments or drawing figures, but such features are not limited to usage in the one or more embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as communicating with each other need not be in continuous communication unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. The illustration of an item in a drawing does not exclude variations and modifications, does not imply that the item is necessary or essential to an embodiment or claimed invention, and does not imply that the item is preferred. Some items may be omitted in some embodiments or occurrences. When a single item is described, more than one item may be used instead of a single item. Where more than one item is described, a single item may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

Embodiments can comprise a block, a tile, multiple blocks or tiles, and/or a set of blocks or tiles. An embodiment can comprise a toy construction set of a plurality of tiles, magnetic tiles, and/or powered magnetized tiles. In any such embodiment, termed clause 1, a set comprises two or more blocks, each particular block of the two or more blocks comprising: a top cover; a bottom cover affixed to the top cover, the bottom cover comprising: three or more edges; one or more magnets mounted respectively near each of the three or more edges; a first edge among the three or more edges comprising a first electrical terminal between a second electrical terminal and a third electrical terminal; and a second edge among the three or more edges comprising a fourth electrical terminal between a fifth electrical terminal and a sixth electrical terminal; at least one conductor that is conductively coupled between the second electrical terminal, the third electrical terminal, the fifth electrical terminal, and the sixth electrical terminal; and a functional component that is conductively coupled to at least one conductor and to one or more of the first electrical terminal and the fourth electrical terminal, wherein the functional component comprises one or more electrical or electronic components. Various embodiments encompass the subject matter of the following numbered clauses:

2 The set of clause 1 further comprising two conductors, one being conductively coupled between the second electrical terminal and the fifth electrical terminal, and another being conductively coupled between the third electrical terminal and the sixth electrical terminal.

3. The set of clause 1, wherein the functional component comprises any of: one or more light-emitting diodes (LEDs); one or more LEDs of a single color; one or more LEDs of multiple colors; one or more LEDs configured to change intensity in patterns using one or more microchips in the one or more LEDs or in a PCB that drives the one or more LEDs; or a flexible OLED display.

4. The set of clause 3, wherein one or more of the top cover and the bottom cover comprise means for modifying light produced from the one or more LEDs.

5. The set of clause 1, wherein the functional component comprises: a power inverter; two or more electroluminescent (EL) wires or films coupled to the power inverter; wherein each of the two or more EL wires or films can illuminate in one or more colors, or has a shape different than another, or extends out of a particular block of the two or more blocks, or extends out of a particular block of the two or more blocks on a Z axis.

6. The set of clause 1, wherein the functional component comprises a microcontroller module coupled to a non-volatile memory and programmed to store information when power is removed; wherein the microcontroller module is programmed to use the non-volatile memory to change a function of a particular block each time that the particular block is reconnected to a power source or a powered block.

7. The set of clause 1, further comprising a power supply separate from the two or more blocks of the set and comprising any of: a power input connector, a transformer, and a power output connector configured to couple to at least the first electrical terminal and either the second electrical terminal or the third electrical terminal; or a USB power cord or adapter.

8. The set of clause 1, further comprising a power supply in at least one block of the two or more blocks of the set, wherein the power supply comprises any of: a user-replaceable battery; an integrated battery; an integrated battery and inductive charging coil; a photovoltaic cell; or one or more supercapacitors.

9. The set of clause 1 wherein the functional component comprises a wire, copper foil tape, or a printed circuit board element.

10. The set of clause 1 wherein the functional component comprises one or more sensors comprising any of: a temperature detection sensor coupled to a circuit configured to adjust a color of an LED of at least one block of the two or more blocks based on an ambient temperature; a humidity sensor coupled to a circuit configured to change light or sound patterns of an LED or sound circuit of at least one block of the two or more blocks based on a humidity level; an air quality sensor coupled to a circuit configured to use particulate monitors to change a display with a number on it or sound and light patterns based on an amount of particles in ambient air; a Geiger counter coupled to a circuit configured to change a display with a number on it or its sound and light patterns based on an ambient level of radiation; an accelerometer coupled to a circuit configured to change an electrical or electronic behavior of at least one block of the two or more blocks based on physical orientation in space; a magnetometer coupled to a circuit configured to detect one or more nearby magnets and change an electrical or electronic behavior of at least one block of the two or more blocks based on a strength of a magnetic field of the one or more nearby magnets; a water detection sensor coupled to a circuit configured to generate an alert to a presence of moisture or water; a gas sensor coupled to a circuit configured to detect an environmental gas; a color sensor coupled to a circuit configured to identify a color of a nearby object; a passive infrared motion sensor coupled to a circuit configured to detect motion; one or more ultrasonic sensors coupled to a circuit configured to perform distance measurement and/or object detection; one or more biodata sensors coupled to a circuit configured to measure heart rate, skin conductivity, and brainwaves; or one or more miniature anemometers coupled to a circuit configured or programmed to detect wind speed and direction.

11. The set of clause 1 wherein the functional component comprises one or more sound production or recording components comprising any of: a sound circuit configured to make a constant sound; a microphone and a speaker coupled to a sound recording circuit configured to record a sound and play the sound back on a button click or in response to a timer; a circuit configured to drive a piezo buzzer; a sound-generating circuit capable of generating sound corresponding to a musical instrument; a sound-generating circuit coupled to a switch and to a speaker and capable of generating sound corresponding to a specified musical note or chord; a music synthesis circuit; a musical tone sequencing circuit; a sound detection circuit configured to change an intensity of an LED of a block in synchrony with sound volume; a sound detection circuit configured to use a bandpass filter to change an intensity of an LED of a block in response to sound volume or sound in a particular band range; or a sound detection circuit configured to turn on or off after detecting an ambient sound.

12. The set of clause 1 wherein the functional component comprises any of: a functional component configured to produce vibration through a motor spinning an off-balance weight; a Bluetooth LE or Bluetooth (non-LE) receiver coupled to a circuit configured to control one or more functions of the particular block; a seven-segment LED display; a seven-segment LC display; a full-color LCD display; an e-ink display; a flexible OLED display; a projector; a powerline network communication module; in a first block of the two or more blocks, a powerline networking transceiver module coupled to a microcontroller comprising firmware programmed to coordinate actions with other blocks of the two or more blocks; a miniature digital video camera coupled to a microcontroller programmed to recognize objects, faces, or gestures; one or more pushbuttons or other mechanical or electromechanical switches, one or more touch toggles, or a touchscreen electronically coupled to a microcontroller programmed to provide a user interface that allows users to set a timer or start a stopwatch, with visual and/or auditory feedback as time elapses; a smart home integration circuit configured to communicate with smart home systems via a wired or wireless networking interface in a particular block or a different block; or one or more miniature electrically powered fans to generate directional airflow.

13. The set of clause 1 further comprising an augmented reality (AR) marker pattern on one or more blocks among the two or more blocks.

14. The set of clause 1, wherein the functional component comprises any of: a one or more capacitors electrically coupled to one another; a series-coupled resistor-capacitor filter; an inductor; a Zener diode; a motor; a buzzer; a potentiometer; or a thermistor.

15. The set of clause 1, wherein the particular block further comprises a seventh electrical terminal; wherein the functional component comprises a hobby servo having a control signal conductor that is conductively coupled to the seventh electrical terminal.

16. The set of clause 1 wherein the bottom cover and top cover are square.

17. The set of clause 1, wherein the one or more magnets are rare earth magnets.

18. The set of clause 1, further comprising one or more jumper wires or cables configured to couple magnetically to the terminals to create electrical connections between non-adjacent blocks.

19. The set of clause 10, further comprising a microcontroller module coupled to the one or more sensors, the microcontroller module comprising one or more non-volatile computer-readable storage devices storing one or more sequences of instructions which, when executed using the microcontroller module, cause the microcontroller module to execute: filtering raw sensor data received from the one or more sensors to remove noise and artifacts, resulting in creating and storing filtered sensor data; analyzing the filtered sensor data to detect one or more patterns or thresholds indicating a trigger event; in response to detecting a trigger event, activating one or more actuators, indicators, or communication devices in a programmed control sequence; logging sensor data, trigger events, and control actions to non-volatile memory for later analysis; entering a low-power sleep mode in response to failing to detect any trigger events in a programmed period; and periodically transmitting logged data to an external device for remote monitoring and analysis.

20. The set of clause 10, further comprising: two or more wireless communication modules located respectively in two or more blocks of the set; a microcontroller module coupled to the one or more sensors, the microcontroller module comprising one or more non-volatile computer-readable storage devices storing one or more sequences of instructions which, when executed using the microcontroller module, cause the microcontroller module to execute: filtering raw sensor data received from the one or more sensors to remove noise and artifacts, resulting in creating and storing filtered sensor data; analyzing the filtered sensor data to detect one or more patterns or thresholds indicating a trigger event; in response to detecting a trigger event, activating one or more actuators, indicators, or communication devices in a programmed control sequence; logging sensor data, trigger events, and control actions to non-volatile memory for later analysis; entering a low-power sleep mode in response to failing to detect any trigger events in a programmed period; and periodically transmitting logged data to an external device for remote monitoring and analysis.

21. The set of clause 1, comprising a toy construction set.

22. A toy construction set of a plurality of tiles that are powered and magnetized, the set comprising: two or more tiles, each particular tile of the plurality of tiles comprising: a top cover; a bottom cover affixed to the top cover, the bottom cover comprising: three or more edges and one or more magnets mounted near each of the three or more edges; a first edge among the three or more edges comprising a first electrical terminal, a second electrical terminal, and a third electrical terminal; and a second edge among the three or more edges comprising a fourth electrical terminal, a fifth electrical terminal, and a sixth electrical terminal; a negative wiring harness that is conductively coupled between the second electrical terminal, the third electrical terminal, the fifth electrical terminal, and the sixth electrical terminal; a positive wiring harness that is conductively coupled between the first electrical terminal and the fourth electrical terminal; and a functional component comprising one or more electrical or electronic components conductively coupled to the negative wiring harness and the positive wiring harness.

23. The toy construction set of powered magnetized tiles of clause 22, wherein the functional component comprises any of: one or more LEDs; one or more LEDs of a single color one or more LEDs of multiple colors; one or more LEDs configured to change intensity in patterns using one or more microchips in the one or more LEDs or in a PCB that drives the one or more LEDs; or a flexible OLED display.

24. The toy construction set of powered magnetized tiles of clause 23, wherein one or more of the top cover and the bottom cover comprise means for modifying light produced from the one or more LEDs.

25. The toy construction set of powered magnetized tiles of clause 22, wherein the functional component comprises: a power inverter; two or more electroluminescent (EL) wires or films coupled to the power inverter;

wherein each of the two or more EL wires or films can illuminate in one or more colors, or has a shape different than another, or extends out of a particular block of the two or more blocks, or extends out of a particular block of the two or more blocks on a Z axis.

26. The toy construction set of powered magnetized tiles of clause 22, wherein the functional component comprises a microcontroller module coupled to a non-volatile memory and programmed to store information when power is removed; wherein the microcontroller is programmed to use the memory to change the functionality of a particular tile each time that the particular block is reconnected to a power source or a powered block.

27. A set comprising: two or more blocks, each particular block of the two or more blocks comprising: a top cover; and a bottom cover affixed to the top cover, the bottom cover comprising: three or more edges; one or more magnets mounted respectively near each of the three or more edges; a first edge among the three or more edges comprising an odd number of terminals, the terminals comprising one or more first terminals for conducting a first polarity or phase of electricity located between symmetrical sets of one or more second terminals for conducting a second, opposite polarity or phase of electricity; a second edge among the three or more edges comprising the odd number of terminals, comprising one or more third terminals for conducting the first polarity or phase of electricity located between symmetrical sets of one or more fourth terminals for conducting the second, opposite polarity or phase of electricity; in the bottom cover, a first conductor that is conductively coupled between the first terminals and the third terminals and a second conductor that is communicatively coupled between the second terminals and the fourth terminals; a functional component that is conductively coupled to the first conductor and to one or more of the first electrical terminal and the fourth electrical terminal, wherein the functional component comprises one or more electrical or electronic components.

28. The set of clause 27, wherein the functional component comprises any of: one or more LEDs; one or more LEDs of a single color; one or more LEDs of multiple colors; one or more LEDs configured to change intensity in patterns using one or more microchips in the one or more LEDs or in a PCB that drives the one or more LEDs; or a flexible OLED display.

29. The set of clause 27, wherein one or more of the top cover and the bottom cover comprise means for modifying light produced from the one or more LEDs.

30. The set of clause 27, wherein the functional component comprises: a power inverter; and two or more electroluminescent (EL) wires or films coupled to the power inverter; wherein each of the two or more EL wires or films can illuminate in one or more colors, or has a shape different than another, or extends out of a particular block of the two or more blocks, or extends out of a particular block of the two or more blocks on a Z axis.

2. Structural Overview

2.1 Example Blocks

FIG. 1 is a perspective view of a powered magnetic block of one embodiment. In one embodiment, block 100 comprises a front cover 102 joined to a back cover 104. Throughout this disclosure, the term "tile" can also refer to a block 100, especially for embodiments in which the physical height or thickness of the block is less than the perimeter dimensions of the block. The block 100 has edges 106, 108, 110, and 112.

The back cover 104 comprises a plurality of terminal units 105A, 105B, 105C, and 105D, the details of which will be further described in connection with FIG. 4. Each of the terminal units 105A, 105B, 105C, and 105D is angularly formed, and therefore each of the edges includes terminal surfaces or faces of two terminals. As further described in other sections, each of the terminal units 105A, 105B, 105C, and 105D can be retained in upstanding walls formed integrally with the bottom cover and a height or thickness of the upstanding walls and the terminal units 105A, 105B, 105C, and 105D spaces apart or separates the front cover 102 and the back cover 104 to form an open compartment, cavity, or space between the covers, which is described further in other sections herein.

In one embodiment, the front cover 102 is joined to the back cover 104 by a plurality of fasteners 107A, 107B, 107C, 107D extending through corresponding holes in the top cover and bottom cover; in various embodiments, the fasteners may comprise rivets, screws, press-fit pins, or other forms of fasteners, and can be made of metals or polymers. Other sections relating to FIG. 4 describe means of fastening in further detail.

For purposes of illustrating a clear example, block 100 of FIG. 1 has a perimeter shape or profile that is generally rectangular or square, but other blocks of other embodiments within the scope of this disclosure can be formed using other geometries and can resemble triangles or hexagons, for example. Furthermore, the terminal units 105A, 105B, 105C, and 105D of block 100 of FIG. 1 are smaller in longitudinal or upward dimensions than their lengths or the overall size of the front cover 102 or the back cover 104. Thus, edges 106, 108, 110, and 112 are relatively narrow, and block 100 is relatively thin or flat in this configuration and can be termed a tile rather than a block. However, the dimensions of FIG. 1 are not to scale, and other embodiments can use other dimensions, whether thicker or thinner. For example, one or more blocks 100 could be cubic or form other thick polyhedrons or thinner and wafer-like.

In an embodiment, the front cover 102 and the back cover 104 comprise a non-conductive material. Examples of non-conductive materials include transparent polycarbonate, acrylic, injection-molded polystyrene, other polymers such as polyethylene or engineering plastics, cast or molded ceramics, and laser-cut or CNC machine-carved wood. The specific non-conductive material is not critical.

Figure 2:
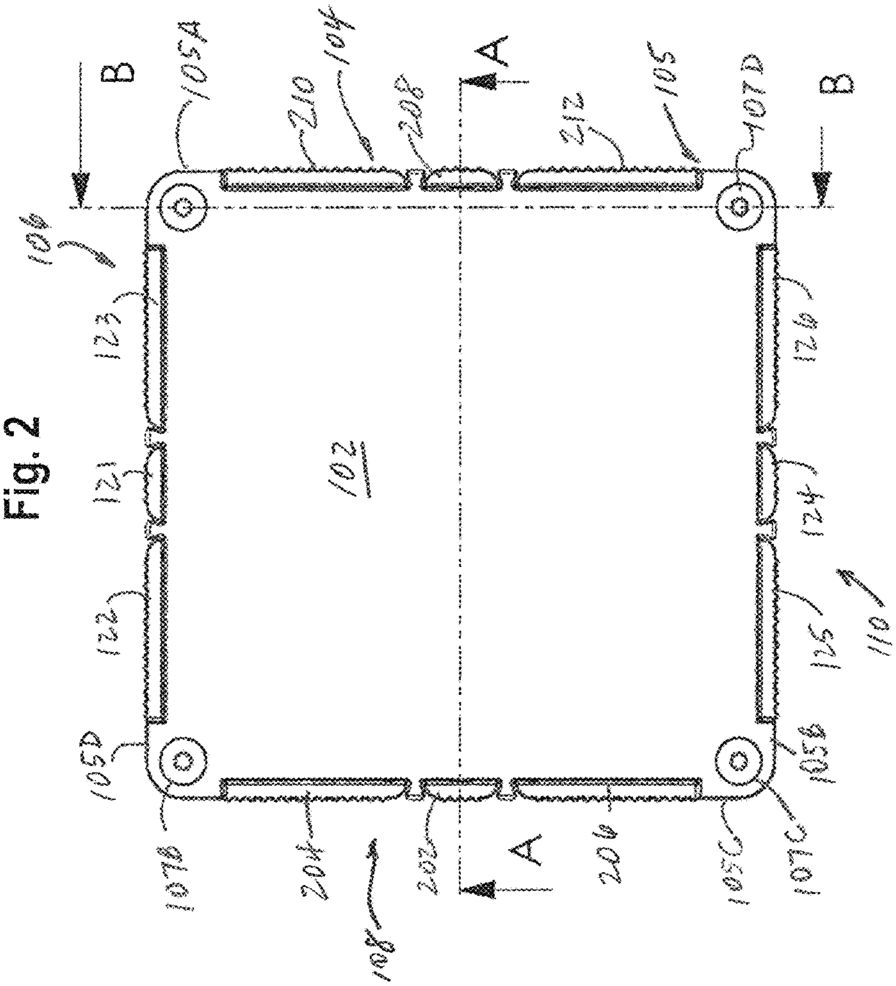
FIG. 2 is a top plan view of the block of FIG. 1.

Each of the edges 106, 108, 110, and 112 comprises three terminal faces capable of electrical conductivity between adjacent blocks when brought into contact with other terminal faces. For example, edge 106 comprises the terminal 121 and the terminal faces 122 and 123; and edge 110 comprises terminal 124 and terminal faces 125 and 126. FIG. 2 is a top plan view of the block of FIG. 1. Referring now to FIG. 2, in an embodiment, edge 105 comprises terminal 208 and terminal faces 210 and 212, and edge 108 comprises terminal 202 and terminal faces 204, 206, thus having a total of three electrical contact points or conducting points per edge. Other embodiments can use other numbers of terminals and terminal faces, provided that each perimeter wall carries two or more terminals or terminal faces. For example, an embodiment can have any odd integer number of terminals and terminal faces, preferably arranged with one or more first terminals for conducting a first polarity or phase of electricity located between symmetrical sets of one or more second terminals for conducting the second, opposite polarity or phase. Some embodiments also can have one or more upstanding perimeter walls, with no terminals, spacing or separating and joining the top cover 102 and back cover 104. For example, in one embodiment, block 100 could have two perimeter walls with two or more terminals and two other walls with no terminals. These pairs of walls could be adjacent to one another or opposite one another.

Each terminal and terminal face comprises a conductive material. Examples of conductive materials include aluminum, aluminum alloys, steel, stainless steel, copper, alloys such as brass or tin, and nickel silver. Each of the terminal units 105A, 105B, 105C, 105D is fixed against a corresponding upstanding wall in the back cover and held snugly when the front cover 102 is fixed or attached to the back cover 104. As further described in other sections, each terminal is electrically connected to one or more conductors in a cavity or space in the back cover 104 and can be used to conduct electricity to functional components in the cavity or space and/or to one or more adjacent blocks.

Figure 3:
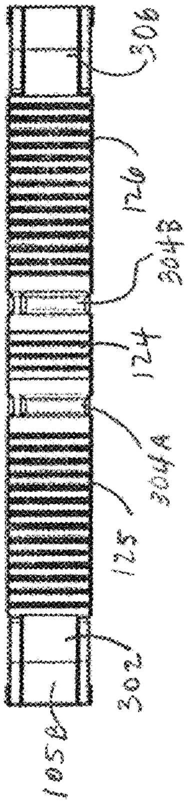
FIG. 3 is a side elevation view of the block of the preceding views.

FIG. 3 is a side elevation view of the block of the preceding views. In an embodiment, each terminal, for example, terminal 124 and terminal faces 125 and 126, visible in FIG. 3, have longitudinal dimensions or heights approximately equal to the height or thickness of the terminal unit 105B that includes terminal face 125. In an embodiment, terminal 124 has a first lateral dimension or width less than the second lateral dimension or width of terminal faces 125 and 126. However, the first and second lateral dimensions can vary in other embodiments, and all terminals or terminal faces could have the same lateral dimension or width. As further described above and in other sections, in terms of voltage polarity or phase during conducting, the terminal faces 125, 126 form a symmetric pair of terminals with the other terminal 124 between them.

In an embodiment, terminal 124 is spaced apart from the terminal faces 125, 126 by portions 304A, 304B of back cover 104. The lateral dimension or width of portions 304A and 304B is not critical and needs only to be sufficient to insulate adjacent terminals from one another and to preclude arcing between terminals when the terminals are conducting electricity. The terminal faces 125 and 126 are spaced apart from adjacent edges of the block by portions 302 and 306 of the back cover 104, and the lateral dimensions or widths of portions 302 and 306 are not critical.

In the embodiment of FIG. 3, terminal 124 and terminal faces 125 and 126 have ridged or knurled surfaces, but other embodiments can use terminals with smooth surfaces or other forms of texture.

In an embodiment, each terminal is coupled mechanically and electrically to an electrically conductive element inside the block, as further detailed in other sections. Each different terminal, among a group of terminals of a single perimeter wall, is associated with a different phase or polarity of electrical power that can be conducted from one group of terminals through the electrically conductive element located inside the block to an electrically active item inside the block and/or to another group of terminals. For example, terminal 124 can be configured to conduct or carry a positive DC voltage, and the terminals that comprise terminal faces 125 and 126 can carry ground potential or conduct a negative DC voltage. In another embodiment, the relative polarity of the terminals can be reversed so that terminal 124 is associated with ground or negative, and terminals comprising terminal faces 125 and 126 are associated with positive voltage. Furthermore, an embodiment with two terminals could carry hot and neutral phases of AC voltage using the two terminals or positive voltage and ground.

In an embodiment, the length of each side or edge of the block 100 of FIG. 1, FIG. 2, FIG. 3 is 75 mm (2.953 in), and the height or thickness of the block is 9.35 mm (0.368 in). These dimensions are not required, and other embodiments may use other dimensions.

2.2 Example Interior Construction with Power Wiring

Figure 4:
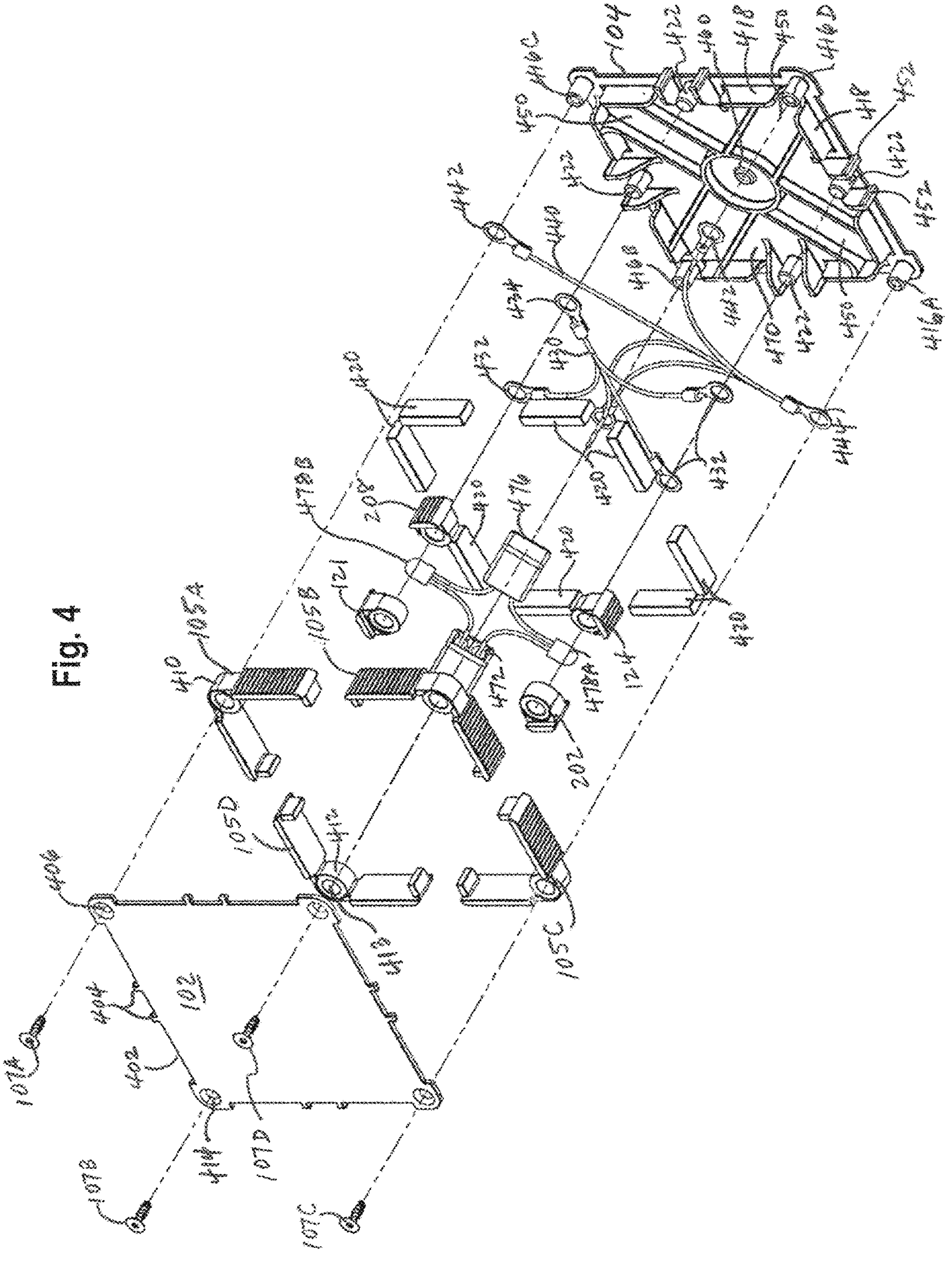
FIG. 4 is an exploded view of one embodiment of the block of the preceding views.
Figure 9:
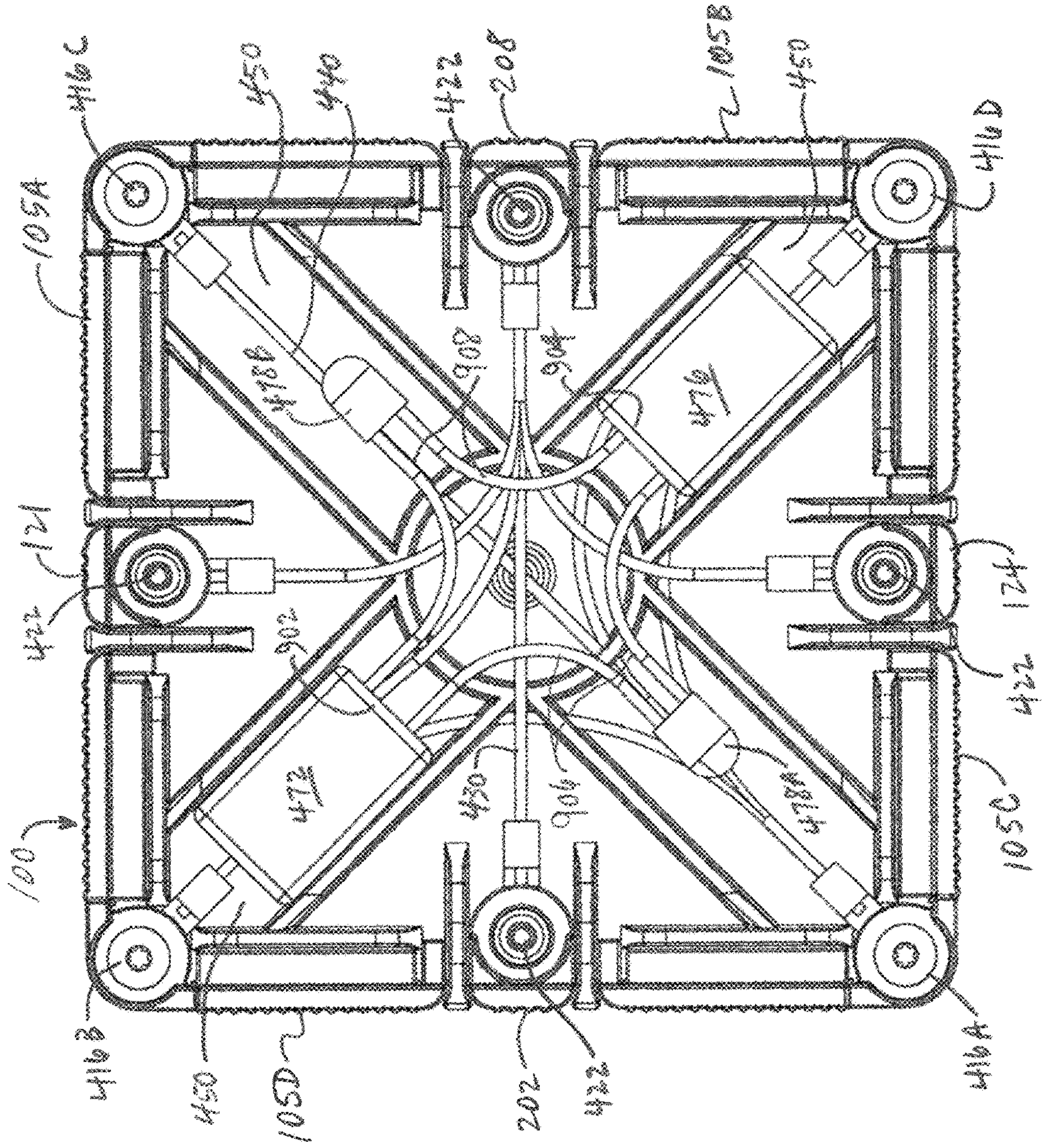
FIG. 9 is a top plan view of the block of the preceding views, with a top cover removed to reveal elements inside the block in the embodiment of FIG. 4.

FIG. 4 is an exploded view of one embodiment of the block of the preceding views. FIG. 9 is a top plan view of the block of the preceding views, with a top cover removed to reveal elements inside the block in the embodiment of FIG. 4. Referring first to FIG. 4, in an embodiment, back cover 102 comprises a plurality of edges 402, each having two outwardly projecting pins 404 corresponding to and fitting over portions 304A and 304B (FIG. 3). Pins 404 function to limit or dampen any lateral movement of terminals like terminals 121, 124, 202, 208, that carry positive voltage or a first phase and are positioned between other terminals.

In an embodiment, two adjacent negative terminals, like adjacent terminal faces from among the terminal faces 122, 123, 125, 126, 204, 206, 210, 212, are formed in angularly joined paired terminal units 105A, 105D, 105C, 105B. Each of the terminal units 105A, 105D, 105C, 105B comprises two terminals of the type and form that have been previously described, joined using a smoothly curved or angled wall 410 between the two terminals. In an embodiment, a generally cylindrical bushing 412 is formed integrally with the angled wall 410. The bushing 412 comprises a centrally located hole or bore 413 that aligns axially with a corresponding hole 414 in the front cover 102.

Further, each hole 414 in the front cover 102 aligns axially with the bushing 412, hole or bore 413, and a corresponding upstanding first cylindrical terminal receiver 416A, 416B, 416C, 416D of the back cover 104. Each receiver 416A, 416B, 416C, 416D can be integrally formed with, attached to, or molded with the back cover 104. Each receiver 416A, 416B, 416C, 416D can comprise interior threads, smooth bores, or retaining elements that accept snap-in fasteners.

In an embodiment, a negative wire harness 440 comprises five wires or other electrical conductors, three of which have a first end terminating in a ring terminal 442 and a second end soldered, crimped, or fused to a fifth ring terminal 444 of a fourth wire. The wires or conductors of the negative wire harness 440 have lengths configured to enable four of the ring terminals to seat axially over one of the receivers 416A, 416B, 416C, 416D. The fifth wire of the negative wire harness 440 connects to a plug-in connector 472, as described below in a separate paragraph.

In this arrangement, one of the fasteners 107A, 107B, 107C, 107D fits through one of the holes 414, through one of the holes or bores 413, and fits into one of the receivers 416A, 416B, 416C, 416D. In such an embodiment, the fasteners 107A, 107B, 107C, 107D can comprise #4 self-tapping screws that self-form threads in corresponding smooth holes or bores via mechanical action when the screws are driven into the holes or bores. The #4 size is not critical for all embodiments, and other sizes can be used depending on the size of a block 100 or to achieve different amounts of holding force. The foregoing arrangement simultaneously mechanically secures the front cover 102 to the back cover 104, mechanically fixes the terminal units 105A, 105B, 105C, 105D, and terminals 121, 124, 202, 208 in position against the back cover, and electrically couples the terminals to the ring terminals of the negative wire harness 440.

In an embodiment, the back cover 104 further comprises a plurality of upstanding walls 418 that act as seating surfaces to position a corresponding plurality of magnets 420 on the back cover 104. Magnets 420 can comprise ferrous magnets, rare earth magnets such as neodymium magnets, samarium-cobalt, or other forms of magnets. When magnets 420 are positioned against upstanding walls 418, each of the magnets is adjacent to individual terminals of the terminal units 105A, 105D, 105C, 105B. Assembling the front cover 102 to the back cover 104 with the fasteners 107A, 107B, 107C, 107D will fix the magnets and terminal units 105A, 105D, 105C, 105B in a block 100 so that blocks can be stacked, placed adjacent to one another, dropped, or moved without dislodging the magnets or the terminal units. Viewing an assembled block 100 from the outside, each of the magnets 420 will be behind a corresponding conductor of the terminal units 105A, 105D, 105C, 105B.

With this arrangement, multiple different assembled blocks 100 can be magnetically attached to one another by bringing different blocks into proximity of one another, causing magnetic attractive forces to lock a first edge of one block against a second edge of another block. Structures comprising a few blocks to many blocks can be assembled rapidly in an arbitrary number of configurations, limited only by the strength of the magnetic attractive forces and any opposing forces, such as gravity or a centrifugal force.

Furthermore, as detailed in other sections, magnetically joining multiple blocks 100 causes the terminal units 105A, 105D, 105C, or 105B of one block to contact the terminal units of another block, simultaneously coupling the blocks electrically. Thus, the magnetic attractive forces of the magnets 420 cause an electrical connection by forcing pairs of the terminal units 105A, 105D, 105C, or 105B of one block into mechanical contact with the terminal units of another block. Because the terminals are electrically conductive, the mechanical contact of terminals, held in place by the magnetic attractive forces, permits current to flow between adjacent, magnetically connected blocks.

In an embodiment, the back cover 104 further comprises a plurality of inwardly protruding and upstanding wing walls 452 that surround positive terminals like terminals 121, 124, 202, 208, providing seating surfaces for the terminals and also separating or dividing those terminals from adjacent terminals that may carry voltage of a different polarity or phase, thus helping to prevent short circuits.

In an embodiment, the back cover 104 further comprises a plurality of second upstanding cylindrical terminal receivers 422 positioned midway along the length of each edge of the back cover. A positive wire harness 430 comprises five wires or other electrical conductors, three of which have a first end terminating in a ring terminal 432 and a second end soldered, crimped, or fused to a fourth ring terminal 434 of the fourth wire. The fifth wire connects to a second push connector 476 as described below in a separate section. The wires or conductors of the positive wire harness 430 have lengths configured to enable each of the four ring terminals to seat axially over one of the receivers 422. Terminals 121, 124, 202, 208, which typically carry positive DC voltage, comprise centrally located holes that snugly fit over the receivers 422. Assembling the front cover 102 to the back cover 104 with the fasteners 107A, 107B, 107C, 107D will fix the terminals 121, 124, 202, 208 in block 100, retained in position via pins 404, so that blocks can be stacked, placed adjacent to one another, dropped, or moved without dislodging the terminals. The foregoing arrangement simultaneously mechanically secures the front cover 102 to the back cover 104, mechanically fixes the terminals 121, 124, 202, 208 in position against the back cover, and electrically couples the terminals to the ring terminals of the positive wire harness 430.

The back cover 104 can be formed, assembled, or molded using a plurality of diagonally extending arms 450 and a central dish structure 460 that contribute structural strength to the back cover to help resist torsion or twisting forces that users might exert on a block 100. As seen in other views, diagonally extending arms 450 also can serve as seating areas and retainers for the first push connector 472 and second push connector 476, which can snugly fit within low upstanding walls of the arms. The diagonally extending arms 450 and a central dish structure 460 can be affixed to or formed integrally with a back cover sheet 470 that serves as a principal, planar wall of the cover. Consequently, when viewed from the outside in a plan view, after assembly, back cover 104 will have the same appearance as the front cover 102 when seen in FIG. 2. The diagonally extending arms 450 and a central dish structure 460 can also provide wire raceways or retainer channels to receive one or more of the positive wire harness 430 and negative wire harness 440. The diagonally extending arms 450 and a central dish structure 460 also can act as ornamentation and could be molded in a color different than other parts of the back.

A block 100 with the configuration of FIG. 4 can accommodate functional, electrical, or electronic components that receive power from external sources via the terminals that have been described. The positive wire harness 430 and the negative wire harness 440 can be formed using stranded or solid conductive wire in various sizes, for example, American Wire Gauge (AWG) sizes AWG 30 to AWG 22. Supply voltage from an external source to the terminals, or within a block 100, and carried using the wire harnesses to power functional, electrical, or electronic components also can vary.

In one embodiment, block 100 comprises a first push connector 472 having a first end that mechanically and electrically connects to a wire of the negative wire harness 440 and a second end that mechanically and electrically connects to two cathode terminals of two light-emitting diodes 478A, 478B. Further, block 100 comprises a second push connector 476, having a first end that mechanically and electrically connects to a wire of the positive wire harness 430 and a second end that mechanically and electrically connects to the anode terminals of the LEDs 478A, 478B. The LEDs can integrally include current-limiting resistors if needed. The first push connector 472 and second push connector 476 comprise, in one embodiment, Wago 2773-402 two-port push connectors, but other embodiments can use other kinds of connectors and/or soldered connections. In this arrangement, when appropriate DC voltage is applied to positive and negative terminals among the terminals of a block 100, the LEDs will illuminate.

To illustrate a clear example, FIG. 4 shows positive wiring harness 430 and negative wiring harness 440 as one example of means for conducting phased or polarized power within a block 100 or tile and between blocks or tiles via the terminals. However, the specific wiring harnesses of FIG. 4 are not required, and other embodiments can use printed circuit boards, wire arranged without harnesses, cables, conductive foil tape, or any other form of conductor that is functionally equivalent to any of the foregoing or to the specified wire harnesses.

Referring now to FIG. 9, as noted earlier, connectors 472, 476 are aligned with and fit snugly in the diagonally extending arms 450. In an embodiment, connector 472 comprises an end 902 having two ports configured to receive, retain by friction, and electrically connect wires extending into the ports. The LED 978A comprises an anode and a cathode that are collectively identified as terminals 906 for simplicity. Similarly, LED 978B has two terminals 908. In an embodiment, with connector 472, a first port of the end 902 receives only a first terminal 906 of the LED 978A; a second port of the end receives a first terminal 908 of the LED 978B and a free wire of the positive wiring harness 430. For connector 476, a first port of an end 904 receives only the other terminal 906 of LED 478A, and a second port receives the other terminal 908 of LED 478B and a free wire of the negative wiring harness 440. In this manner, the LEDs 478A, 478B are coupled in parallel to the wiring harnesses. The term "free" is used in reference to the wires of the wiring harnesses because the other wires of the wiring harnesses are fixed via round terminals to attachment points. For example, a plurality of wires of the positive wiring harness 430 comprise round terminals that are seated on receivers 422 of terminals 121, 124, 202, 208 and retained via friction and in electrical contact with the terminals when the top cover 102 is secured to the back cover 104. Similarly, a plurality of wires of the negative wiring harness 440 comprise round terminals that fit over and are secured on cylindrical terminal receivers 416A, 416B, 416C, 416D.

Figure 6:
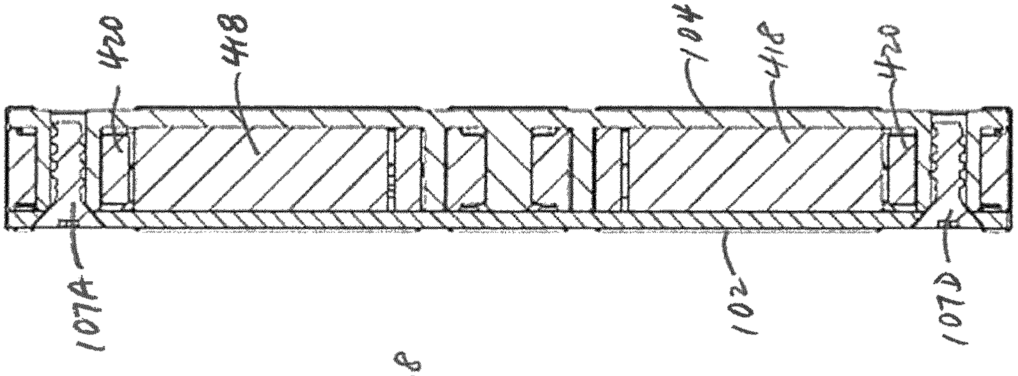
FIG. 6 is a section view of the block of the preceding views, taken along line B-B of FIG. 2.
Figure 5:
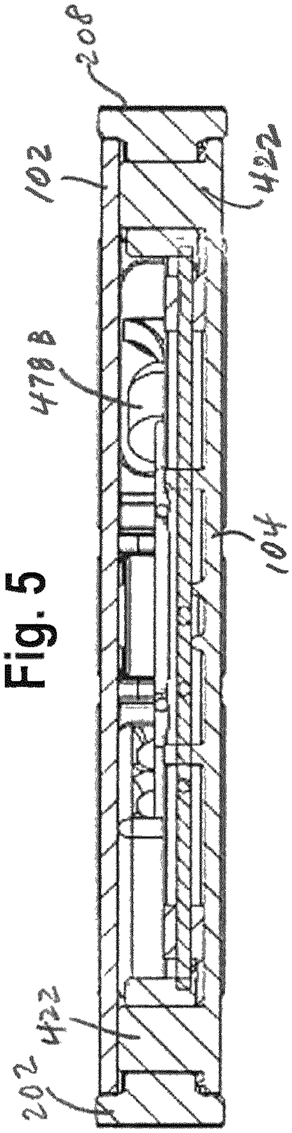
FIG. 5 is a section view of the block of the preceding views, taken along line A-A of FIG. 2.

FIG. 5 is a section view of the block of the preceding views, taken along line A-A of FIG. 2. FIG. 6 is a section view of the block of the preceding views, taken along line B-B of FIG. 2. The views of FIG. 5 and FIG. 6 are provided to supplement an understanding of the mechanical arrangements of the parts that have been previously described when positioned in an assembled block 100. For example, FIG. 5 shows that terminals 202, 208 extend outwardly slightly beyond the ends of top cover 102 and back cover 104. This arrangement ensures that the terminals 202, 208 will mechanically contact other terminals when two blocks 100 are brought together and magnetically linked, thereby enabling the terminals to conduct electricity between such adjacent blocks. Other terminals of other views, such as the terminal faces 122, 123, 125, 126, 204, 206, 210, and 212, of terminal units 105A, 105B, 105C, 105D also protrude outwardly slightly to enable adjacent blocks to mechanically link via magnetic attraction and establish conducting paths between attached terminal faces or terminals.

3. Functional Components

3.1 Examples of Blocks and Arrangements of Multiple Blocks

Figure 7:
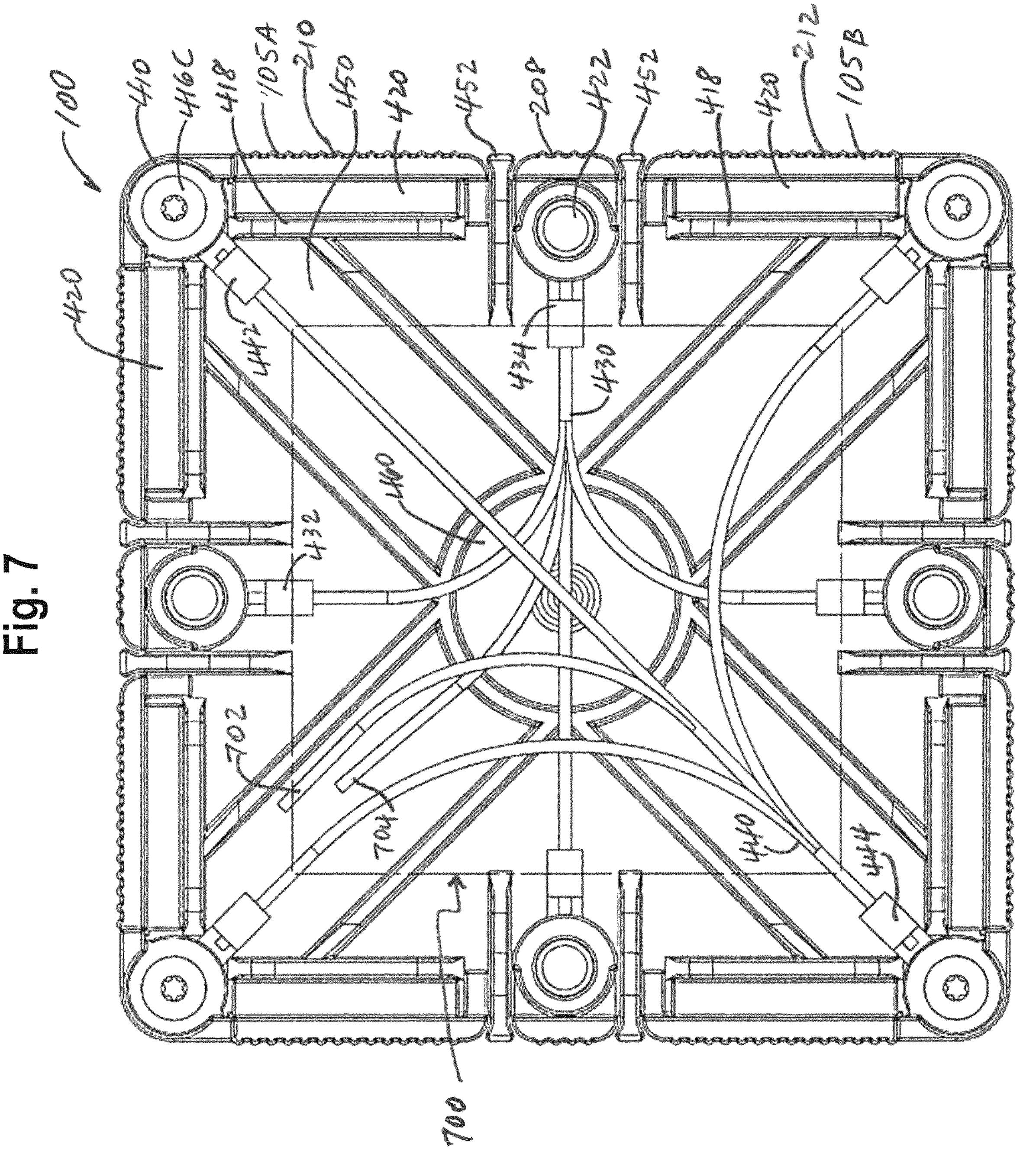
FIG. 7 is a top plan view of the block of the preceding views, with a top cover removed to reveal elements inside the block in a first embodiment.

FIG. 7 is a top plan view of the block of the preceding views, with a top cover removed to reveal elements inside the block in a first embodiment. Representative reference numerals are provided to illustrate the mechanical arrangement and electrical connections of parts in an assembled block 100. Furthermore, FIG. 7 shows that block 100, in one embodiment, can hold, carry, or incorporate any number of functional, electrical, or electronic components within the approximate limits of space 700. Thus, rather than the LEDs of FIG. 4 and other views, an embodiment can include any components that space 700 can accommodate. Components in space 700 can comprise power sources such as batteries or can receive power from an external or internal power source. For example, when block 100 receives power via terminal 208 and terminal faces 210, 212, the wires 702 and 704 of the negative wire harness 440 and positive wire harness 430 can be electrically connected to the components in space 700 to power those components.

Figure 8:
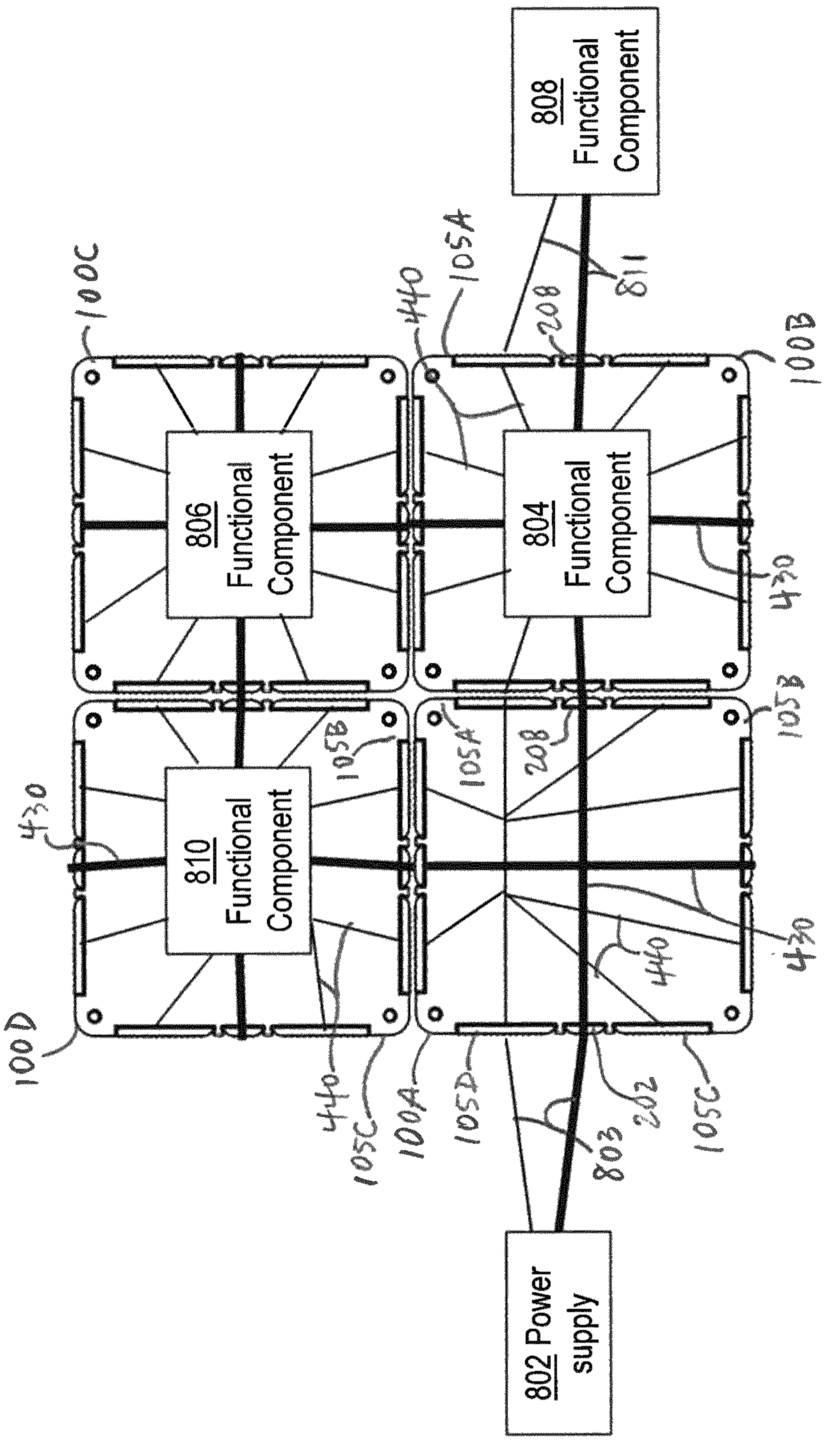
FIG. 8 is a schematic illustration of multiple blocks of the preceding views magnetically attached to one another and showing power conduction paths and power connections to functional elements.

FIG. 8 is a schematic illustration of multiple blocks of the preceding views magnetically attached to one another and showing power conduction paths and power connections to functional elements. In one embodiment, a first block 100A is magnetically affixed to a second block 100B, which in turn is magnetically affixed to a third block 100C. Block 100A is also magnetically affixed to one side of a fourth block 100D, which has a second side magnetically affixed to the third block 100C. FIG. 8 thus shows one possible magnetically coupled arrangement of four blocks 100 in a 2×2 rectangular grid, but any number of blocks can be magnetically affixed in arbitrary arrangements, patterns, or structures.

In an embodiment, a power supply 802 is electrically coupled via conductive wires 803 or a cable to terminal unit 105D and terminal 202 of the first block 100A. In another embodiment, the power supply 802 could be electrically coupled directly to the positive wiring harness 430 and negative wiring harness 440 through a hole or connector in the top cover 102. For example, the wiring harnesses may extend through the hole and terminate at a quick-connect terminal, to which the power supply connects. The wires 803 or a cable can terminate in magnetic terminals, connectors, studs, or other means of mechanical and electrical connections to the terminal unit 105D and terminal 202 of the first block 100A. Assume that the power supply 802 provides a positive or polarized DC voltage relative to ground, for purposes of the example of FIG. 8. In this embodiment, the interior of the first block 100A comprises the positive wiring harness 430 and negative wiring harness 440, which are illustrated schematically for clarity, rather than with every detail of the embodiment of FIG. 4. In this arrangement, in the first block 100A, terminal unit 105D is electrically coupled to terminal unit 105A in a straight-through power forwarding arrangement, as well as to the other negative terminals of the first block, which are omitted for clarity. Terminal unit 105D is also electrically coupled to terminal units 105A and 105B of the fourth block 100D. Further, terminal 202 is electrically coupled to terminal 208 and the other positive terminals.

Block 100B also includes the positive wiring harness 430 and negative wiring harness 440, illustrated schematically for clarity, and a functional component 804. Therefore, when the first block 100A is magnetically attached to the second block 100B, a conductive power path is formed between the power supply 802 and the functional component 804 in the second block via the positive wiring harness 430 and the negative wiring harness 440. The functional component is thus powered by the power supply 802. Similarly, magnetically attaching the second block 100B to the third block 100C forms a conductive power path from the power supply 802 through both the first block 100A and the second block 100B to the third block 100C and another functional component 806. Magnetically affixing the first block 100A to the fourth block 100D also forms a conductive power path from the power supply 802 through the wiring harnesses to terminals of the fourth block and a third functional component 810 of the fourth block. In this manner, a single power supply 802 can supply power to any number of magnetically affixed blocks, subject to the maximum current output of the power supply and the total current draw of functional components of all the blocks, as power is effectively forwarded to or conducted among all the blocks via the wiring harnesses and terminals.

Given the mechanical structure of the positive wiring harness 430 and the negative wiring harness 440 and the electrical connections shown in FIG. 4, each functional component 804, 806, 810 is electrically coupled in parallel to the power supply 802 and not in series. Therefore, a failure of one functional component 804 will not affect the electrical operation of another functional component 806, 810.

A fourth functional component 808 can be positioned externally with respect to the blocks 100A, 100B, 100C. The fourth functional component 808 can be electrically coupled using wires 811 or a cable to terminal unit 105A and terminal 208 of the second block 100B. The wires 811 or a cable can terminate in magnetic terminals, connectors, studs, or other means of mechanical and electrical connections to the terminal unit 105A and terminal 208 of the third block 100A. In this manner, the fourth functional component 808 is electrically coupled in parallel with the other functional components to the power supply 802.

In this arrangement, FIG. 8 shows a 2×2 matrix of blocks 100 in which a single power supply, within or outside a block, can supply power to all the blocks regardless of the orientation or order of connection of the blocks, and also to an external functional component. While a 2×2 matrix is shown to illustrate a clear example, a plurality of blocks 100 can be arranged in any sequence, set, or order, in two dimensions on a flat surface or in three dimensions by magnetically attaching the edges of one or more blocks at angles with respect to edges of other blocks. Blocks can be arranged in rows, columns, or irregular sets. Blocks can form closed or open structures. In all cases, whenever a power supply is present, and the conductive terminals of blocks are in mechanical contact, electric current from the power supply can conduct into the blocks to power the functional components.

3.2 Examples of Functional Components

To illustrate a clear example, FIG. 4, FIG. 5, and FIG. 7 show a specific arrangement of LEDs, connectors, and wire harnesses. However, other embodiments can use different functional, electrical, or electronic components, connectors, and wiring. Thus, this disclosure identifies and describes various functional, electric, and electronic components that can be in block 100 to illustrate clear examples. However, the disclosure broadly encompasses any active or passive electric, electronic, digital, wired, or wireless element that is physically possible to include in a block 100 or another tile structure, whether known now or discovered later. The following sections describe further examples that can be used in various embodiments. The term "functional component," for FIG. 8 and throughout the disclosure, can refer to any electrical or electronic component in, outside or, or associated with a block 100 or tile that receives power via the block, the terminals of a block, and the wiring harnesses of a block, and operates or has the features and characteristics as specified in the description.

WIRING. An embodiment could comprise a set of jumper wires or cables to create electrical connections between non-adjacent blocks.

PCBs. Blocks 100 may or may not use a printed circuit board (PCB) to achieve functionality. The functional components, when included, could be incorporated into a PCB, into a wiring harness, directly connected, or a multiplicity of these.

POWER. In various embodiments, the supply voltage to block 100 can range from 2 volts to 14 volts. Block 100 may also use custom power supplies at different voltages. A particular block 100 or a set of blocks could be configured with compatibility with various voltages, such as both 5V and 9V systems. Power to block 100 may be supplied externally, such as from a USB power cord or adapter, a custom power supply or adapter, or another power transformer. Power may be supplied to block 100 internally via user-replaceable batteries, integrated Li-On batteries using Li-On or other chemistry, pre-charged or inductively charged through a block, or via supercapacitors.

LIGHT-EMITTING DIODES (LEDs). Different embodiments can use one or more LEDs, optionally with a light guide to show a character, with a diffuser, in a single color, in multiple colors, or with changing intensity in patterns using microchips in the LED or in a PCB that drives the LEDs. Furthermore, the appearance of colored light can also be achieved using a single-color white LED and tiles formed of colored translucent plastic. One or more of the top cover 102 and the back cover 104 can comprise means for modifying light produced from the one or more LEDs, such as light guides, diffusers, lenses, Fresnel lenses, lighting gels, polarizers, or filters.

SUPERCAPACITORS. A block 100 can incorporate one or more supercapacitors to allow the block to continue to operate after being disconnected from a power source, to provide power for volatile memory, to provide power for a low-power display, like an E-ink or E-paper display, or to provide power for a timer or clock that can continue when the system is powered down, or when a block 100 is removed from a system.

LIGHT DETECTION. In an embodiment, a block 100 or tile can have a functional component comprising a switch that turns off when light is detected or, inversely, turns on when light is detected. In an embodiment, a block 100 or tile can also have a functional component that uses incoming light to add power to the system or to change its display, sound, or light patterns.

SOUND PRODUCTION. In an embodiment, a block 100 or tile can comprise a functional component configured to make a constant sound or record a sound and play it back on a button click or timer. In an embodiment, a block 100 or tile can also comprise a functional component configured to make a sound regularly on a timer or use a piezo buzzer or a small speaker to become a musical instrument. In an embodiment, users can use these functional components to create sequences of notes, program simple tunes, or synchronize music across tiles. In this manner, a block 100 or tile can operate as a music sequencer or synthesizer. In an embodiment, different blocks or tiles can comprise a push-button that is series coupled to the power source of the blocks or tiles and the functional component to create different sounds when their button is pressed. In an embodiment, the user could form an orchestra by combining many tiles.

SOUND DETECTION. In an embodiment, a block 100 or tile can comprise a functional component configured to change the intensity of an LED of the block or tile in synchrony with sound volume or use a band filter to change the intensity of an LED of the block or tile when the volume of sound in a particular band range is detected. In an embodiment, a block 100 or tile can also comprise a functional component configured to turn on or off after detecting an ambient sound, such as a user clapping twice or saying, "Hey Electrotiles, turn on."

TEMPERATURE DETECTION. In an embodiment, a block 100 or tile can comprise a functional component configured to adjust the color of an LED of the block or tile based on the ambient temperature. For example, cooler temperatures could trigger a blue light, while warmer temperatures switch to red.

HUMIDITY SENSING. In an embodiment, a block 100 or tile can comprise a functional component configured to change its light or sound patterns based on the humidity level.

AIR QUALITY SENSING. In an embodiment, a block 100 or tile can comprise a functional component configured to use particulate monitors to change a display with a number on it or its sound and light patterns based on the number of particles in the air.

RADIATION SENSING. In an embodiment, a block 100 or tile can comprise a functional component configured to use a Geiger counter to change a display with a number on it or its sound and light patterns based on the level of radiation in the environment.

ACCELEROMETER. In an embodiment, a block 100 or tile can comprise a functional component configured to change the electrical or electronic behavior of the block or tile based on physical orientation in space. For example, a block 100 or tile can comprise a functional component configured to display a different color depending on which side is up or turn sounds or lights on or off depending on the physical orientation in space of the block or tile. In an embodiment, a block 100 or tile can also comprise a functional component configured to use rolling ball sensors or tilt switches to accomplish actions in response to physical position changes.

MAGNETOMETER. In an embodiment, a block 100 or tile can comprise a functional component configured to detect passing or nearby magnets and change the electrical or electronic behavior of the block or tile accordingly. For example, a block 100 or tile can comprise a functional component configured to turn a light or connectivity on or off during detection or count up or switch on or off on each detection.

WATER DETECTION SENSOR. In an embodiment, a block 100 or tile can comprise a functional component configured to alert users to the presence of moisture or water, which can be useful for interactive science experiments or practical applications like leak detection.

GAS SENSORS. In an embodiment, a block 100 or tile can comprise a functional component configured to detect specific environmental gases, which can be useful for safety or educational purposes, such as identifying carbon monoxide or natural gas leaks.

COLOR SENSOR. In an embodiment, a block 100 or tile can comprise a functional component configured to identify colors placed above the tile. This can be used in educational games, matching activities, or to change the tile's color to match scanned objects.

In any of the embodiments using sensors, a block or tile can further comprise a microcontroller module coupled to one or more sensors or two or more wireless communication modules located respectively in two or more blocks of the set; a microcontroller module coupled to the one or more sensors. In any such embodiment, the microcontroller module may comprise one or more non-volatile computer-readable storage devices storing one or more sequences of instructions which, when executed using the microcontroller module, cause the microcontroller module to execute stored control program. An example sequence of operations that could be programmed is: filtering raw sensor data received from one or more sensors to remove noise and artifacts, resulting in creating and storing filtered sensor data; analyzing the filtered sensor data to detect one or more patterns or thresholds indicating a trigger event; in response to detecting a trigger event, activating one or more actuators, indicators, or communication devices in a programmed control sequence; logging sensor data, trigger events, and control actions to non-volatile memory for later analysis; to conserve power, entering a low-power sleep mode in response to failing to detect any trigger events in a programmed period; and periodically transmitting logged data to an external device for remote monitoring and analysis. Suitable programs can be created in source languages like Objective-C, C, C++, Java, other structured languages, or assembler, then compiled or assembled to one or more executables and written to NVRAM or EPROM of the microcontroller module.

VIBRATION OR HAPTIC FEEDBACK. In an embodiment, a block 100 or tile can comprise a functional component configured to produce vibration through a motor spinning an off-balance weight.

MOTION DETECTION. In an embodiment, a block 100 or tile can incorporate a passive infrared sensor to detect motion. In an embodiment, a block 100 or tile can comprise a functional component configured to light up or play sounds when a person or object passes by, adding an interactive element to rooms or spaces. In an embodiment, a block 100 or tile can also comprise one or more ultrasonic sensors for precise distance measurement and object detection. In an embodiment, a block 100 or tile can comprise a functional component configured to change a display, light, or sound pattern based on the distance of detected objects from sensor signals.

COMMUNICATION. In an embodiment, a block 100 or tile can comprise a Bluetooth LE or Bluetooth (non-LE) receiver to control one or more aspects of the functionality of the block or tile, such as turning its electrical connectivity on or off, changing LED color, changing LED intensity, making sounds, or adjusting or turning any other feature on or off. In an embodiment, a block 100 or tile can also comprise and use NFC or infrared transceivers to send and receive information.

DISPLAY. In an embodiment, a block 100 or tile can comprise and be programmed or configured to use various types of displays, such as seven-segment LED or LC displays, full-color LCD displays, e-ink displays, flexible OLED displays, or projectors. In an embodiment, a block 100 or tile can comprise a functional component configured to use any such display to show numbers, pictures, live images, or projections. Seven-segment displays can be used to count events like taps or button clicks. Full-color LCDs could be coupled to a microcontroller that is programmed to display a picture that is uploaded via USB or Bluetooth LE. An e-ink display could be coupled to a microcontroller that drives images and would enable images to remain on display after the power is turned off. A flexible OLED display could show images like the full-color LCD display using a screen conforming to the physical configuration of a block 100. A projector could comprise a laser, an LED, or an LCD plus a lens system to project images onto a surface.

POWERLINE COMMUNICATION. In an embodiment, a block 100 or tile can comprise a functional component configured to use the ground and power lines of the block or tile, for example, using wiring harnesses 430, 440, for low-bandwidth communication via powerline transceivers. In an embodiment, a block 100 or tile can comprise a functional component configured or programmed to use such powerline communication to coordinate actions with other tiles, such as synchronizing displays, collaborating on functions, facilitating interactive games, or integrating with smart home systems. In one or more of these embodiments, a plurality of blocks 100 or tiles remain connected only by the ground and power lines.

Blocks 100 or tiles equipped with powerline communication transceivers can execute coordinated actions using an embedded microcontroller, stored program control, and communication of packets, messages, or signals over the power lines. For example, two or more blocks 100 or tiles could be programmed to synchronize LED patterns or colors to create large, cohesive visual displays. Two or more blocks 100 or tiles could be programmed to work together on tasks, like aggregating sensor readings for temperature, light, sound, or other attributes across multiple blocks or tiles for more accurate environmental monitoring. Two or more blocks 100 or tiles could be programmed to facilitate complex, interactive games where actions on one tile affect others, enabling puzzles or multiplayer gaming experiences. Two or more blocks 100 or tiles could be programmed to communicate with smart home systems via a central tile connected to the home network, allowing tiles to display notifications or control smart devices based on user interaction.

MEMORY. In an embodiment, a block 100 or tile can comprise a non-volatile memory onboard and coupled to a compatible microcontroller programmed to store information when power is removed. The microcontroller can be in the same block or tile or a different block or tile. In an embodiment, a block 100 or tile can be programmed or configured to use the memory to change the functionality of the block or tile each time that the block or tile is reconnected to a power source or to another block or tile that is powered. For example, in response to a power-up event, the block 100 or tile can be programmed or configured to cycle through different modes, such as steady on, blinking, or back to initial.

ELECTROLUMINESCENT COMPONENTS. In an embodiment, a block 100 or tile can comprise a power inverter to create power for electroluminescent (EL) wire, film, or other components. In an embodiment, a block 100 or tile can comprise a EL wire, film, or other components configured or programmed to illuminate the block 100 or tile or outside of the block or tile, for users to make custom shapes. In an embodiment, a block 100 or tile can also comprise multiple differently colored EL components or mount EL wire in custom-shaped tiles in the shape of characters and figurines. The custom shape may extend vertically from the Z axis of the block 100 or tile.

AUGMENTED REALITY INTEGRATION. In an embodiment, a block 100 or tile can comprise an augmented reality (AR) marker pattern. The AR marker pattern can be unique per block or tile. With this arrangement, users can view block 100 or tiles through an AR-enabled app hosted on a mobile computing device to see virtual three-dimensional (3D) content associated with or attached to each block 100 or tile. Users can also interact with the virtual objects by manipulating the physical blocks or tiles.

AUDIO RECORDING AND PLAYBACK. In an embodiment, a block 100 or tile can comprise a microphone and/or a loudspeaker as the functional component. In an embodiment, a block 100 or tile can comprise a functional component configured or programmed to record and play back audio samples by receiving sound via the microphone and/or playing sound through the loudspeaker.

COMPUTER VISION. In an embodiment, a block 100 or tile can comprise a miniature digital video camera and a microcontroller or microcomputer with embedded machine learning (ML) programming or capabilities. In an embodiment, a block 100 or tile can comprise a functional component configured or programmed to recognize objects, faces, gestures, and more.

BIODATA SENSING. In an embodiment, a block 100 or tile can comprise one or more functional components, such as skin contact sensors, configured or programmed to measure heart rate, skin conductivity, and brainwaves. In an embodiment, a block 100 or tile can also comprise a functional component configured or programmed to use biofeedback by generating and displaying colors or patterns, with any of the display components that have been previously described, based on programmatic analysis of signals or data from the sensors that indicate body state.

AIRFLOW SENSING AND GENERATION. In an embodiment, a block 100 or tile can comprise a functional component such as one or more miniature anemometers configured or programmed to detect wind speed and direction. In an embodiment, a block 100 or tile can comprise one or more miniature electrically powered fans to generate directional airflow. In an embodiment, a block 100 or tile can comprise a functional component configured or programmed to use one or more of the anemometers or fans and one or more of the lighting and display components that have been previously described to visualize airflow patterns or create interactive wind-based experiences.

MUSIC SEQUENCER/SYNTHESIZER. In an embodiment, a block 100 or tile can comprise a functional component such as a piezo buzzer or a small speaker and other functional components that are configured or programmed to operate the block or tile as a musical instrument. Users can create sequences of notes, program simple tunes, or synchronize music across tiles.

COUNTDOWN TIMER/STOPWATCH. In an embodiment, a block 100 or tile can comprise a functional component configured or programmed to provide a user interface that allows users to set a timer or start a stopwatch, with visual and/or auditory feedback as the time elapses. Examples of user interface components include sets of pushbuttons or other mechanical or electromechanical switches, touch toggles, and touchscreens electronically coupled to a compatible microcontroller or microcomputer programmed to execute the functions that have been described.

SMART HOME INTEGRATION. In an embodiment, a block 100 or tile can comprise a functional component configured or programmed to communicate with smart home systems via a wired or wireless networking interface in the same block or tile or a different block or tile and connected to a home network. In an embodiment, a block 100 or tile can comprise a functional component configured or programmed to use this communication to display notifications or control smart devices based on user interaction.

FLEXIBLE OLED DISPLAY. In an embodiment, block 100 or a tile can comprise a functional component configured or programmed to show images like a full-color LCD on a screen that conforms to the tile.

PHOTOVOLTAICS. In an embodiment, a block 100 or tile can comprise a functional component configured or programmed to use ambient or applied light to generate or add power to a system comprising one or more tiles. Use incoming light levels to change a display or sound and light patterns.

4. Extensions and Alternatives

In the foregoing specification, embodiments of the invention have been described with reference to numerous specific details that may vary from implementation to implementation. Accordingly, the specification and drawings are to be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

What is claimed is:

1. A set comprising:

two or more blocks, each particular block of the two or more blocks comprising:

a top cover;

a bottom cover affixed to the top cover, the bottom cover comprising:

three or more edges;

one or more magnets mounted respectively near each of the three or more edges;

a first edge among the three or more edges comprising a first electrical terminal between a second electrical terminal and a third electrical terminal;

a second edge among the three or more edges comprising a fourth electrical terminal between a fifth electrical terminal and a sixth electrical terminal;

each of the one or more magnets being behind a different particular electrical terminal among the first electrical terminal, the second electrical terminal, the third electrical terminal, the fourth electrical terminal, the fifth electrical terminal, and the sixth electrical terminal;

three or more receivers, each affixed to one of the three or more edges of the bottom cover;

a negative wiring harness that is conductively coupled between the second electrical terminal, the third electrical terminal, the fifth electrical terminal, and the sixth electrical terminal, wherein the negative wiring harness comprises at least one conductor;

a positive wiring harness that is conductively coupled between the first electrical terminal and the fourth electrical terminal, wherein the positive wiring harness comprises at least three conductors, each of the conductors configured to seat over a respective one of the three or more receivers; and a functional component that is conductively coupled to the positive wiring harness and the negative wiring harness, wherein the functional component comprises one or more electrical or electronic components.

2. The set of claim 1, wherein the negative wiring harness comprises two conductors, one being conductively coupled between the second electrical terminal and the fifth electrical terminal, and another being conductively coupled between the third electrical terminal and the sixth electrical terminal.

3. The set of claim 1, wherein the functional component comprises any of:

one or more light-emitting diodes (LEDs);

one or more LEDs of a single color;

one or more LEDs of multiple colors; or one or more LEDs configured to change intensity in patterns using one or more microchips in the one or more LEDs or in a PCB that drives the one or more LEDs.

4. The set of claim 3, wherein one or more of the top cover and the bottom cover comprise means for modifying light produced from the one or more LEDs.

5. The set of claim 1, wherein the functional component comprises:

a power inverter; and two or more electroluminescent (EL) wires or films coupled to the power inverter;

wherein each of the two or more EL wires or films can illuminate in one or more colors, or has a shape different than another, or extends out of a particular block of the two or more blocks.

6. The set of claim 1, wherein the functional component comprises a microcontroller module coupled to a non-volatile memory and programmed to store information when power is removed;

wherein the microcontroller module is programmed to use the non-volatile memory to change a function of a particular block each time that the particular block is reconnected to a power source or a powered block.

7. The set of claim 1, further comprising a power supply separate from the two or more blocks of the set and comprising any of:

a power input connector, a transformer, and a power output connector configured to couple to at least the first electrical terminal and either the second electrical terminal or the third electrical terminal; or a USB power cord or adapter.

8. The set of claim 1, further comprising a power supply in at least one block of the two or more blocks of the set, wherein the power supply comprises any of:

a user-replaceable battery;

an integrated battery;

an integrated battery and inductive charging coil;

a photovoltaic cell; or one or more supercapacitors.

9. The set of claim 1 wherein the functional component comprises a wire, copper foil tape, or a printed circuit board element.

10. The set of claim 1 wherein the functional component comprises one or more sensors comprising any of:

a temperature detection sensor coupled to a circuit configured to adjust a color of an LED of at least one block of the two or more blocks based on an ambient temperature;

a humidity sensor coupled to a circuit configured to change light or sound patterns of an LED or sound circuit of at least one block of the two or more blocks based on a humidity level;

an air quality sensor coupled to a circuit configured to use particulate monitors to change a display with a number on it or sound and light patterns based on an amount of particles in ambient air;

a Geiger counter coupled to a circuit configured to change a display with a number on it or its sound and light patterns based on an ambient level of radiation;

an accelerometer coupled to a circuit configured to change an electrical or electronic behavior of at least one block of the two or more blocks based on physical orientation in space;

a magnetometer coupled to a circuit configured to detect one or more nearby magnets and change an electrical or electronic behavior of at least one block of the two or more blocks based on a strength of a magnetic field of the one or more nearby magnets;

a water detection sensor coupled to a circuit configured to generate an alert to a presence of moisture or water;

a gas sensor coupled to a circuit configured to detect an environmental gas;

a color sensor coupled to a circuit configured to identify a color of a nearby object;

a passive infrared motion sensor coupled to a circuit configured to detect motion;

one or more ultrasonic sensors coupled to a circuit configured to perform distance measurement and/or object detection;

one or more biodata sensors coupled to a circuit configured to measure heart rate, skin conductivity, and brainwaves; or one or more miniature anemometers coupled to a circuit configured or programmed to detect wind speed and direction.

11. The set of claim 1 wherein the functional component comprises one or more sound production or recording components comprising any of:

a sound circuit configured to make a constant sound;

a microphone and a speaker coupled to a sound recording circuit configured to record a sound and play the sound back on a button click or in response to a timer;

a circuit configured to drive a piezo buzzer;

a sound-generating circuit capable of generating sound corresponding to a musical instrument;

a sound-generating circuit coupled to a switch and to a speaker and capable of generating sound corresponding to a specified musical note or chord;

a music synthesis circuit;

a musical tone sequencing circuit;

a sound detection circuit configured to change an intensity of an LED of a block in synchrony with sound volume;

a sound detection circuit configured to use a bandpass filter to change an intensity of an LED of a block in response to sound volume or sound in a particular band range; or a sound detection circuit configured to turn on or off after detecting an ambient sound.

12. The set of claim 1 wherein the functional component comprises a seven-segment LED display.

13. The set of claim 1 further comprising an augmented reality (AR) marker pattern on one or more blocks among the two or more blocks.

14. The set of claim 1, wherein the functional component comprises any of: a one or more capacitors electrically coupled to one another; a series-coupled resistor-capacitor filter; an inductor; a Zener diode; a motor; a buzzer; a potentiometer; or a thermistor.

15. The set of claim 1 wherein the bottom cover and top cover are square.

16. The set of claim 1, wherein the one or more magnets are rare earth magnets.

17. The set of claim 1, further comprising one or more jumper wires or cables configured to couple magnetically to the terminals to create electrical connections between non-adjacent blocks.

18. The set of claim 1, comprising a toy construction set.

19. A toy construction set of a plurality of tiles that are powered and magnetized, the set comprising:

two or more tiles, each particular tile of the plurality of tiles comprising:

a top cover;

a bottom cover affixed to the top cover, the bottom cover comprising:

three or more edges and one or more magnets mounted near each of the three or more edges;

a first edge among the three or more edges comprising a first electrical terminal, a second electrical terminal, and a third electrical terminal;

a second edge among the three or more edges comprising a fourth electrical terminal, a fifth electrical terminal, and a sixth electrical terminal;

each of the one or more magnets being behind a different particular electrical terminal among the first electrical terminal, the second electrical terminal, the third electrical terminal, the fourth electrical terminal, the fifth electrical terminal, and the sixth electrical terminal;

three or more receivers each affixed to one of the three or more edges of the bottom cover;

a negative wiring harness that is conductively coupled between the second electrical terminal, the third electrical terminal, the fifth electrical terminal, and the sixth electrical terminal;

a positive wiring harness that is conductively coupled between the first electrical terminal and the fourth electrical terminal, wherein the positive wiring harness comprises at least three conductors, each of the conductors configured to seat over a respective one of the three or more receivers; and a functional component comprising one or more electrical or electronic components conductively coupled to the negative wiring harness and the positive wiring harness.

20. The toy construction set of claim 19, wherein the functional component comprises any of:

one or more LEDs;

one or more LEDs of a single color;

one or more LEDs of multiple colors; or one or more LEDs configured to change intensity in patterns using one or more microchips in the one or more LEDs or in a PCB that drives the one or more LEDs.

21. The toy construction set of claim 20, wherein one or more of the top cover and the bottom cover comprise means for modifying light produced from the one or more LEDs.

22. The toy construction set of claim 19, wherein the functional component comprises:

a power inverter; and two or more electroluminescent (EL) wires or films coupled to the power inverter;

wherein each of the two or more EL wires or films can illuminate in one or more colors, or has a shape different than another, or extends out of a particular block of the two or more blocks.

23. The toy construction set of claim 19, wherein the functional component comprises a microcontroller module coupled to a non-volatile memory and programmed to store information when power is removed;

wherein the microcontroller is programmed to use the memory to change the functionality of a particular tile each time that the particular tile is reconnected to a power source or a powered tile.

24. The toy construction set of claim 19, wherein the negative wiring harness comprises three wires, each of the three wires of the negative wiring harness having a first end terminating at a particular electrical terminal among the second electrical terminal, the third electrical terminal, and the fifth electrical terminal, and second ends all terminating at the sixth electrical terminal.

25. A set comprising:

two or more blocks, each particular block of the two or more blocks comprising:

a top cover; and a bottom cover affixed to the top cover, the bottom cover comprising:

three or more edges;

one or more magnets mounted respectively near each of the three or more edges;

a first edge among the three or more edges comprising an odd number of terminals, the terminals comprising one or more first terminals for conducting a first polarity or phase of electricity located between symmetrical sets of one or more second terminals for conducting a second, opposite polarity or phase of electricity;

a second edge among the three or more edges comprising the odd number of terminals, comprising one or more third terminals for conducting the first polarity or phase of electricity located between symmetrical sets of one or more fourth terminals for conducting the second, opposite polarity or phase of electricity;

each of the one or more magnets being behind a different particular electrical terminal among the first terminals, the second terminals, the third terminals, and the fourth terminals;

three or more receivers, each affixed to one of the three or more edges of the bottom cover;

a negative wiring harness that is conductively coupled between the first terminals and the third terminals;

a positive wiring harness that is conductively coupled between the second terminals and the fourth terminals, wherein the positive wiring harness comprises at least three conductors, each of the conductors configured to seat over a respective one of the three or more receivers; and a functional component that is conductively coupled to the positive wiring harness and the negative wiring harness, wherein the functional component comprises one or more electrical or electronic components.

26. The set of claim 25, wherein the functional component comprises any of:

one or more LEDs;

one or more LEDs of a single color;

one or more LEDs of multiple colors;

one or more LEDs configured to change intensity in patterns using one or more microchips in the one or more LEDs or in a PCB that drives the one or more LEDs; or a flexible OLED display.

27. The set of claim 26, wherein one or more of the top cover and the bottom cover comprise means for modifying light produced from the one or more LEDs.

* * * * *